United States Patent [19]
Yoshihara et al.

[11] Patent Number: 5,522,349
[45] Date of Patent: Jun. 4, 1996

[54] WATER INJECTING TYPE DIESEL ENGINE

[75] Inventors: Sadao Yoshihara; Masahiko Okabe; Tooru Nakamura, all of Kobe, Japan

[73] Assignee: Mitsubishi Jukogyo Kabushiki Kaisha, Tokyo, Japan

[21] Appl. No.: 390,545

[22] Filed: Feb. 17, 1995

[30] Foreign Application Priority Data

Feb. 21, 1994 [JP] Japan .................................. 6-046406

[51] Int. Cl.6 .................................................. F02B 47/02
[52] U.S. Cl. ........................ 123/25 C; 123/25 Q
[58] Field of Search .................. 123/25 R, 25 C, 123/25 Q

[56] References Cited

U.S. PATENT DOCUMENTS

| | | | |
|---|---|---|---|
| 2,584,560 | 2/1952 | Darche | 123/25 C |
| 4,176,632 | 12/1979 | Franke | 123/75 |
| 4,417,447 | 11/1983 | Thomas | 123/25 C |
| 4,805,571 | 2/1989 | Humphrey | 123/25 C |
| 4,936,262 | 6/1990 | Paul et al. | 123/25 C |
| 5,012,772 | 5/1991 | Nakamura | 123/25 C |
| 5,400,746 | 3/1995 | Susa et al. | 123/25 C |

FOREIGN PATENT DOCUMENTS

| | | | |
|---|---|---|---|
| 946858 | 8/1956 | Germany | F02B 47/02 |
| 59-085471 | 5/1984 | Japan | F02M 25/02 |
| 62-218654 | 9/1987 | Japan | F02M 43/00 |
| 5195800 | 8/1993 | Japan | F02B 47/02 |

*Primary Examiner*—Erick R. Solis
*Attorney, Agent, or Firm*—Arnold, White & Durkee

[57] ABSTRACT

An object of the invention is to provide a diesel engine of water injecting type having fuel injecting valves and water injecting valves wherein water mists are adapted to reach high-temperature regions of fuel mists so that the temperature can be reduced to inhibit the generation of NOx. In order to achieve the object, the fuel injecting valves and the water injecting valves are arranged separately in different sites, ones in the top wall of the cylinder cover and the others in the side wall, so that high-temperature regions of fuel mists are mixed with water mists in right angles to each other to lower the combustion temperature thereby reducing the generation of NOx.

3 Claims, 3 Drawing Sheets

WATER INJECTING TYPE DIESEL ENGINE

FIELD OF THE INVENTION AND RELATED ART STATEMENT

The present invention relates to a water injecting type diesel engine, and in particular relates to a large-scale diesel engine for use in a ship.

Recent diesel engines tend to employ a system of water injection to spray the fuel and water into the combustion chamber in order to reduce nitrogen oxides (NOx) in the exhaust gases.

FIG. 3 shows a related art example of a large-scale two-cycle diesel engine of water injecting type.

In the figure, the diesel engine has a cylinder cover 1, a cylinder liner 2, a piston 3 and an exhaust valve container 5. Designated at 4 is a combustion chamber which is defined by the cylinder cover 1, the cylinder liner 2 and the top face of the piston 3.

A reference numeral 10 designates a fuel injecting valve for spraying highly pressurized fuel delivered from an unillustrated fuel injection pump into the combustion chamber 4. A reference numeral 11 designates a water injecting valve for spraying water supplied from an unillustrated water pump into the combustion chamber 4 at a proper timing.

This large-scale diesel engine typically has a plurality of the fuel injecting valves 10 and the water injecting valves 11 both attached to respective fixing holes disposed on a top wall la of the cylinder cover 1.

FIGS. 4 and 5 shows a related art engine system having three fuel injecting valves 10-1 to 10-3 and three water injecting valves 11-1 to 11-3.

All the fuel injecting valves 10-1 to 10-3 are disposed equiangularly on a circle on a level plane (a plane which lies perpendicular to a cylinder axis 100) as shown in FIG. 5. Similarly, all the water injecting valves 11-1 to 11-3 are disposed equiangularly on the same circle on a level plane. The fuel injecting valves 10-1 to 10-3 spray fuel mists $F_1$ to $F_3$, respectively while the water injecting valves 11-1 to 11-3 inject water mist $W_1$ to $W_3$ toward respective fuel mists.

The above conventional diesel engine of water injecting type having the aforementioned arrangement of the fuel injecting valves 10-1 to 10-3 and water injecting valves 11-1 to 11-3, however, has the following drawbacks:

(1) As shown in FIG. 5, each water injecting valve 11-1, 11-2 or 11-3 is placed downstream of a corresponding fuel injecting valve 10-1, 10-2 or 10-3 so that each water mist $W_1$, $W_2$ or $W_3$ is ejected in the same direction with that of the corresponding fuel mist $F_1$, $F_2$ or $F_3$.

Therefore, the water mist will not reach the front-end region of the fuel mist $F_1$ at which the temperature is highest and therefore NOx compounds generate most actively in that region and the reach of the water mist $W_1$ is limited within the central region of the fuel mist $F_1$ in which the temperature of the mist is lower than the front-end part. Accordingly, the temperature reduction by spraying water will not be done well enough to effectively reduce the NOx components.

(2) At least four attachment holes, in total, must be provided for the top wall la of the cylinder head for attaching the fuel valves and the water valves. Hence, the cylinder cover 1 reduces in its strength and requires a complicated structure.

OBJECT AND SUMMARY OF THE INVENTION

It is therefore an object of the present invention to provide a diesel engine of water injecting type in which reducing characteristics of NOx components are improved by driving water mists to reach high-temperature regions of fuel mists and in which reduction of the cylinder cover in strength due to the attachment of injecting valves is prevented.

In accordance with the first aspect of the present invention, a diesel engine of water injecting type includes: fuel injecting valves attached on a side wall of a cylinder cover for spraying fuel mists from the interior side surface of a combustion chamber inside the cylinder cover in directions approximately perpendicular to the axis of a cylinder; and water injecting valves attached on a top wall of the cylinder cover for spraying water mists from the interior upper surface of the combustion chamber inside the cylinder cover in directions approximately perpendicular to those of the fuel mists ejected.

In accordance with the second aspect of the present invention, a diesel engine of water injecting type includes: fuel injecting valves attached on a top wall of the cylinder cover for spraying fuel mists from the interior upper surface of a combustion chamber inside the cylinder cover in directions approximately parallel to the axis of a cylinder; and water injecting valves attached on a side wall of a cylinder cover for spraying water mists from the interior side surface of the combustion chamber inside the cylinder cover in directions approximately perpendicular to those of the fuel mists ejected.

Since directions of ejecting fuel mists are approximately right angles with those of ejecting water mists, it is possible to bring water mists to front-end regions of fuel mists where the temperature is high. Accordingly, it is possible to quickly reduce the temperature of the high-temperature regions, thereby suppressing the generation of NOx.

Since the fuel injecting valves and the water injecting valves are arranged separately in different sites, or ones in the top wall of the cylinder cover and the others in the side wall, it is possible to take greater intervals along the circumferential direction between respective valves. Accordingly, no congestion of attachment holes for injecting valves occurs so that it is possible to prevent the cylinder cover from reducing in its strength as well as to simplify the structure of the engine and make it compact.

DETAILED DESCRIPTION OF PREFERRED EMBODIMENTS

Now, referring to FIGS. 1 and 2, an embodiment of the present invention will be described.

Figure 1:
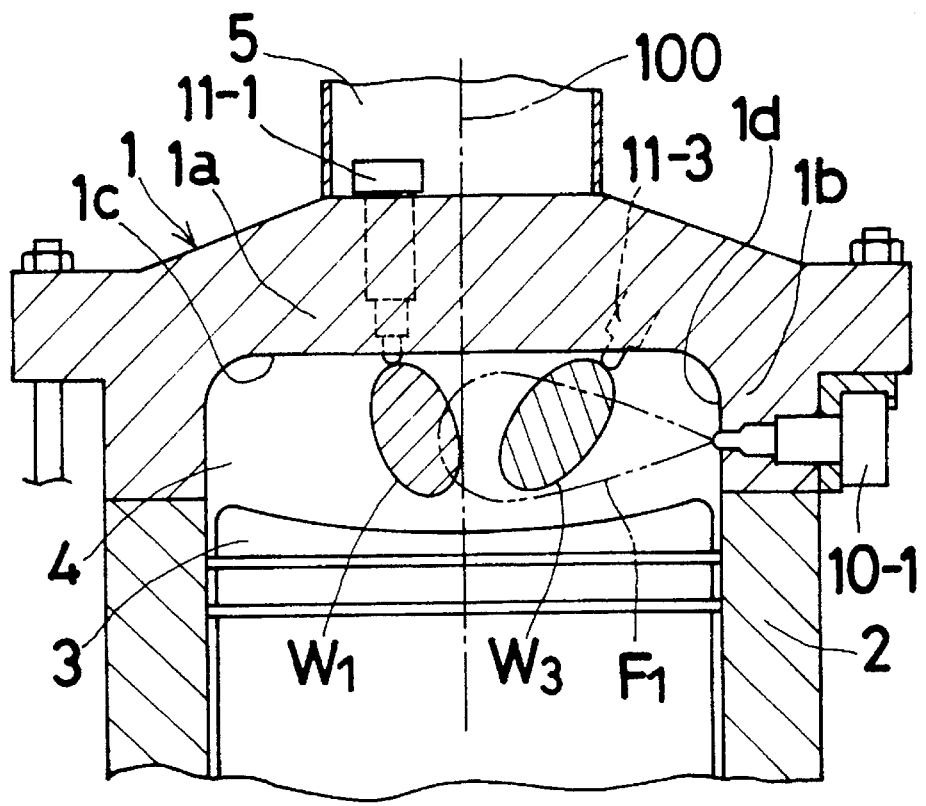
FIG. 1 is a sectional view showing a combustion chamber and its surroundings of a large-scale diesel engine of water injecting type in accordance with an embodiment of the present invention.

FIG. 1 is a sectional view showing a combustion chamber and its surroundings of a large-scale two cycle diesel engine of water injecting type in accordance with the first embodiment of the present invention. FIG. 2 is a plan view showing an arrangement of injecting valves of the same engine, viewed from an axial direction of a cylinder.

In the figures, the diesel engine has a cylinder cover 1, a cylinder liner 2, a piston 3 and an exhaust valve container 5. Designated at 4 is a combustion chamber which is defined by top and side walls 1a and 1b of the cylinder cover 1, the cylinder liner 2 and the top face of the piston 3. A reference numeral 100 designates a cylinder axis.

Reference numerals 10-1, 10-2 and 10-3 designate fuel injecting valves for spraying highly pressurized fuel delivered from an unillustrated fuel injecting pump into the combustion chamber 4. Reference numerals 11-1, 11-2 and 11-3 designate water injecting valves for spraying water supplied from an unillustrated water pump into the combustion chamber 4 at a proper timing mentioned hereinafter.

All the fuel injecting valves (in this embodiment three valves 10-1 to 10-3) are disposed equiangularly or approximately equiangularly on the same level on the side wall 1b of the cylinder cover 1. Each fuel injecting valve is attached so that the fuel mist is ejected from the interior side surface 1d inside the combustion chamber at approximately right angles with the cylinder axis 100.

The water injecting valves of the same number with that of the fuel injecting valves 10-1 to 10-3 (in this embodiment three water injecting valves 11-1 to 11-3) are provided for a top wall 1a inside the cylinder cover 1 in equiangular or approximately equiangular positions on a circle so that the water mist from each valve may be ejected from an upper interior surface 1c inside the cylinder cover 1 at approximately right angles with the ejecting direction of the fuel mist from the corresponding fuel injecting valve 10-1, 10-2 or 10-3 or in a direction approximately in parallel with the cylinder axis 100 and each water mist may collide with the front-end region of the fuel mist in which the temperature is highest.

In the above description, although the fuel injecting valves 10-1 to 10-3 and the water injecting valves 11-1 to 11-3 were not described on their specific structures, a typical publicly known automatic injecting valve may be used which has a nozzle tip having a plurality of injection holes and a needle valve which is pressed with a proper valve-opening pressure by a needle valve spring so as to open and close the fuel passage to the injection holes.

Next, the operation of the thus constructed diesel engine of water injecting type will be described. When highly pressurized fuel sent out at a predetermined injecting timing from the fuel injecting pump (not shown) is sprayed inside the combustion chamber 4 through the fuel injecting valves 10-1 to 10-3, fuel mists $F_1$, $F_2$ and $F_3$ from respective fuel injecting valves 10-1 to 10-3 develop in directions approximately perpendicular to that of the cylinder axis 100.

Water is sprayed from the water injecting valves 11-1 to 11-3 after a predetermined interval from the time the fuel is injected. The water mists are ejected in directions approximately perpendicular to those of the fuel mists ejected or in directions parallel to that of the cylinder axis 100.

Figure 2:
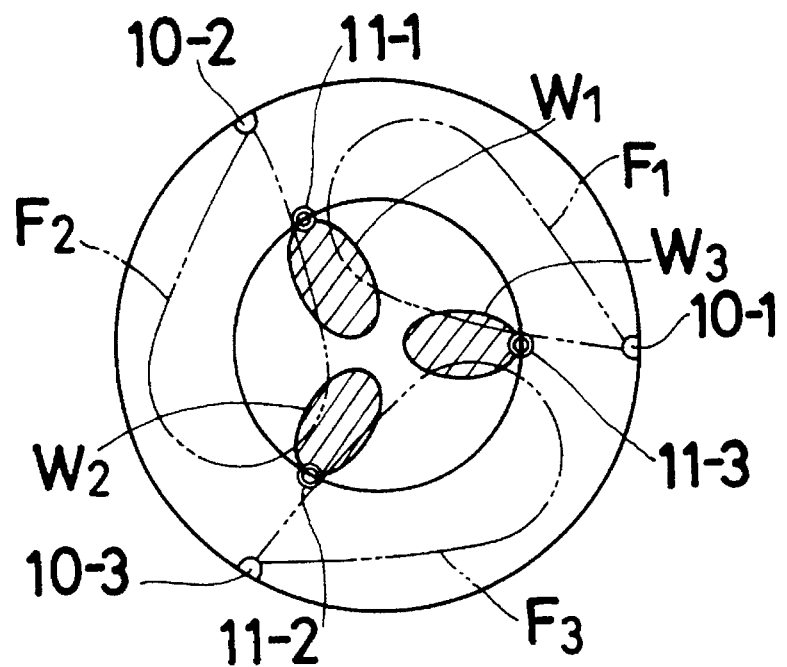
FIG. 2 is a plan view showing an arrangement of injecting valves in the same embodiment shown in FIG. 1.
Figure 3:
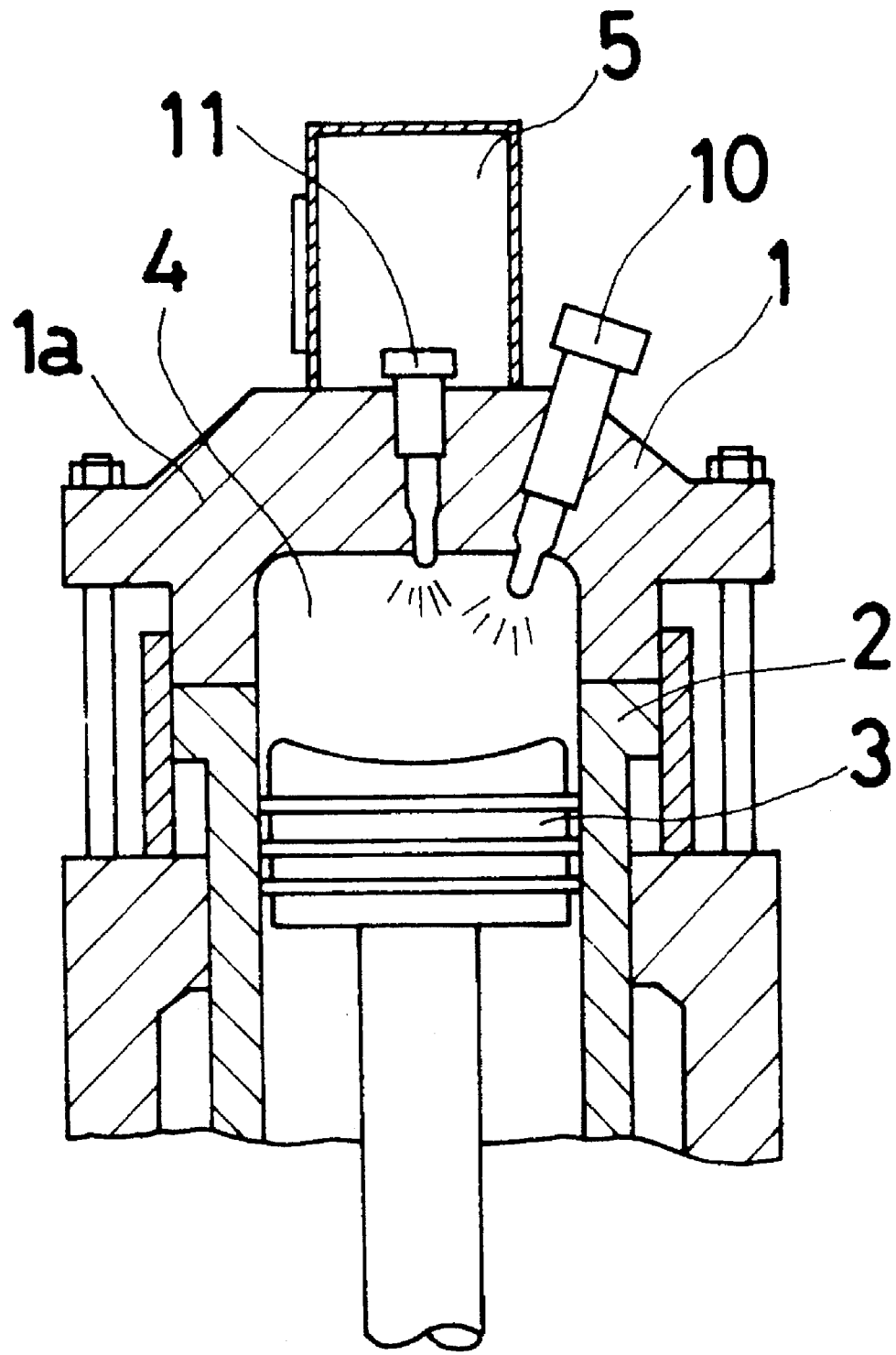
FIG. 3 is a sectional view a combustion chamber and its surroundings of a conventional large-scale two-cycle diesel engine of water injecting type.
Figure 4:
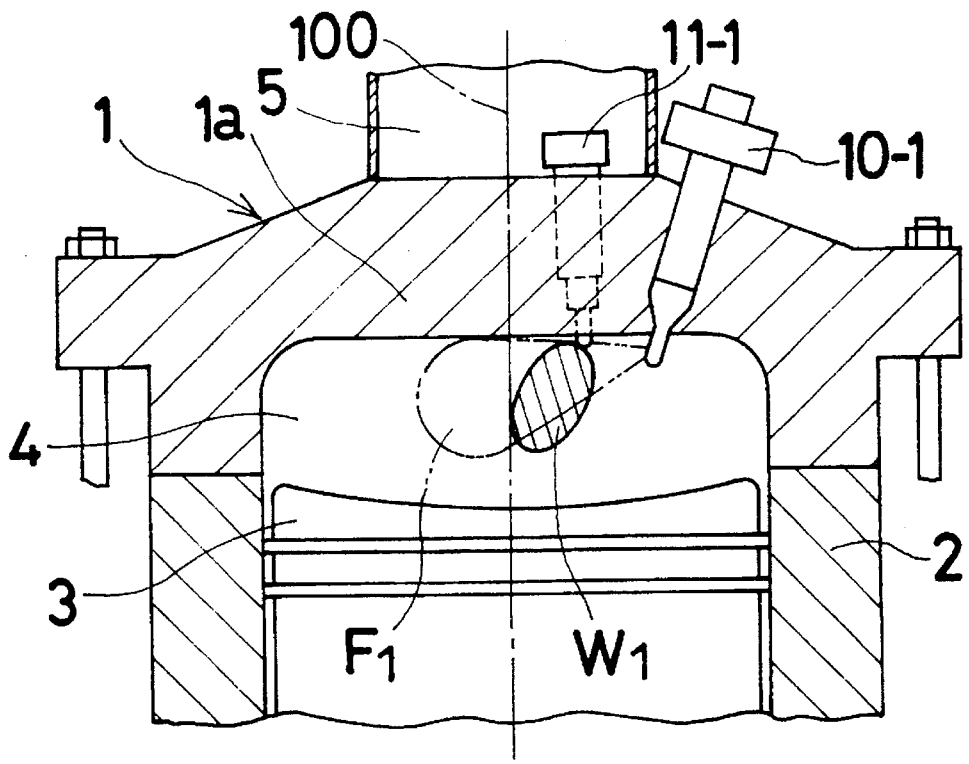
FIG. 4 is a sectional view of the conventional diesel engine corresponding to that shown in FIG. 1.
Figure 5:
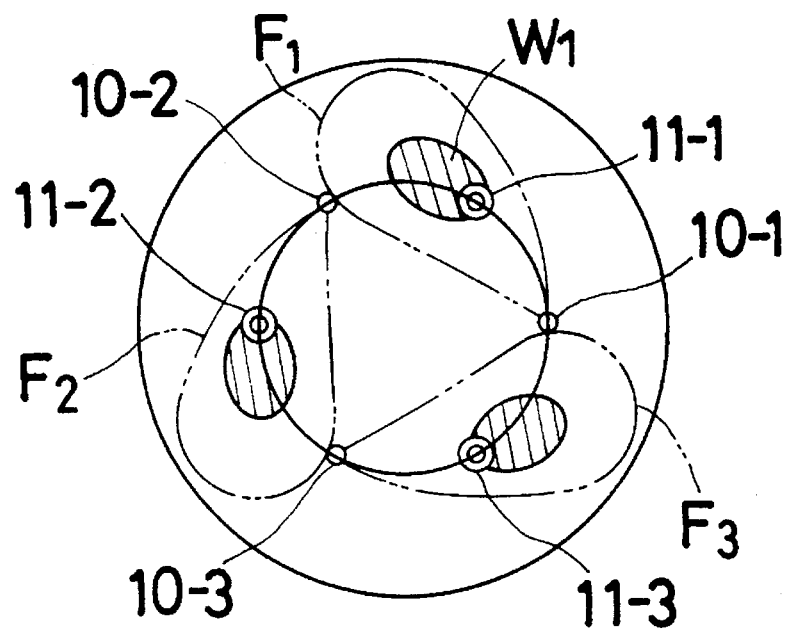
FIG. 5 is a plan view of the conventional diesel engine corresponding to that shown in FIG. 2.

In this case, as shown in FIGS. 1 and 2, water mists $W_1$ to $W_3$ sprayed from the water valves 11-1 to 11-3 reach the front end regions (where the temperature is highest) of the fuel mists $F_1$ to $F_3$ ejected from the combustion valves 10-1 to 10-3 and having developed at right angles with the cylinder axis 100. Therefore, the high-temperature regions can be readily reduced in temperature.

As a result, the maximum burning temperature is reduced, whereby the generation of NOx is inhibited.

Next, in the second embodiment of the present invention, which will be described without referring to any drawing, the fuel injecting valves and water injecting valves are arranged in the opposite manner as in the first embodiment shown in FIGS. 1 and 2. More specifically, fuel injecting valves 10-1, 10-2 and 10-3 are disposed in the top wall 1a of the cylinder cover so that the fuel mists are sprayed from the upper interior surface 1c of the combustion chamber inside the cylinder cover in directions approximately parallel to the cylinder axis. Water injecting valves 11-1, 11-2 and 11-3 are provided in the side wall 1b on the cylinder cover so that water mists are sprayed from the interior side surface 1d of the combustion chamber inside the cylinder cover in directions approximately perpendicular to those of the fuel mist ejected.

The operation and effects of this embodiment are the same with those described as to the first embodiment.

Although three fuel injecting valves 10-1 to 10-3 and three water injecting valves 11-1 to 11-3 are provided in the above embodiments, the number of the valves should not be limited as long as each kind of valves is equal in number to the other kind of valves.

As the present invention is thus configurated, that is, each fuel mist and the corresponding water mist cross each other at right angles, water mists may easily reach the high-temperature regions of the fuel mists. Accordingly, it is possible to quickly reduce the temperature of the high-temperature regions and therefore it is possible to suppress the whole combustion temperature to a low degree, enabling reduction of NOx.

Since the fuel injecting valves and the water injecting valves are arranged separately in different sites, or ones in the top wall of the cylinder cover and the others in the side wall, machining of the attachment holes for injecting valves will not concentrate on one site. Accordingly, it is possible to prevent the cylinder cover from reducing in its strength as well as to simplify the structure of the engine.

What is claimed is:

1. A diesel engine of the water injecting type including fuel injecting valves and water injecting valves disposed in a cylinder cover, comprising said fuel injecting valves being attached to a side wall of the cylinder cover for spraying fuel from an internal side surface of a combustion chamber inside the cylinder cover in directions approximately perpendicular to the central line of the cylinder; and said water injecting valves being attached to a top wall of the cylinder cover for spraying water from the internal upper surface of the combustion chamber inside the cylinder cover in directions approximately perpendicular to the direction of fuel injection and jetting water spray onto the front end of the high-temperature region of fuel spray.

2. A diesel engine of the water injecting type including fuel injecting valves and water injecting valves disposed in a cylinder cover, comprising said fuel injecting valves being attached to a top wall of the cylinder cover for spraying fuel from the internal upper surface of a combustion chamber inside the cylinder cover in directions approximately parallel to the central line of a cylinder; and said water injecting valves being attached to a side wall of the cylinder cover for spraying water from the side surface of the combustion chamber inside the cylinder cover in directions approximately perpendicular to the direction of fuel injection and jetting water onto the from end of the high-temperature region of fuel spray.

3. A diesel engine of the water injecting type, as claimed in claim 1 or 2, wherein a plurality of said fuel injecting valves and water injecting valves are provided alternately.

* * * * *